US006140390A

United States Patent [19]

Bugner et al.

[11] Patent Number: 6,140,390

[45] Date of Patent: Oct. 31, 2000

[54] MELT-FUSIBLE INKJET RECORDING ELEMENTS AND INKS WITH IMPROVED DURABILITY

[75] Inventors: Douglas E. Bugner; Lori Shaw-Klein; David E. Decker, all of Rochester; Paul E. Woodgate, Spencerport, all of N.Y.

[73] Assignee: Eastman Kodak Company, Rochester, N.Y.

[21] Appl. No.: 09/144,389

[22] Filed: Aug. 31, 1998

[51] Int. Cl.[7] ............................ C09D 11/10; C08L 33/02; C08L 33/08; C08L 33/10; B32B 27/08

[52] U.S. Cl. .......................... 523/160; 524/556; 524/560; 428/515; 428/195

[58] Field of Search ..................................... 523/160, 161; 524/556, 560, 561, 568, 571; 428/195, 507, 511, 515; 427/466

[56] References Cited

U.S. PATENT DOCUMENTS

| | | | |
|---|---|---|---|
| 5,085,698 | 2/1992 | Ma et al. | 524/388 |
| 5,112,398 | 5/1992 | Kruse | 106/31.27 |
| 5,288,598 | 2/1994 | Sterman et al. . | |
| 5,310,778 | 5/1994 | Shor et al. | 524/556 |
| 5,374,475 | 12/1994 | Walchli . | |
| 5,405,678 | 4/1995 | Bilodeau | 428/211 |
| 5,413,854 | 5/1995 | Sato | 428/318.4 |
| 5,537,137 | 7/1996 | Held et al. | 347/105 |
| 5,596,027 | 1/1997 | Mead et al. | 523/161 |
| 5,637,635 | 6/1997 | Patel | 524/400 |
| 5,677,067 | 10/1997 | Kojima et al. | 428/478.2 |
| 5,747,146 | 5/1998 | Kashiwazaki et al. | 428/206 |
| 5,764,262 | 6/1998 | Wu et al. . | |
| 5,821,283 | 10/1998 | Hesler at al. | 523/161 |
| 5,889,083 | 3/1999 | Zhu | 523/161 |
| 5,906,905 | 5/1999 | Malhotra | 430/97 |
| 5,912,085 | 6/1999 | Ito et al. | 428/500 |
| 6,028,155 | 2/2000 | Collins et al. | 526/270 |

FOREIGN PATENT DOCUMENTS

| | | |
|---|---|---|
| 0556649 | 8/1993 | European Pat. Off. . |
| 0775596 | 5/1997 | European Pat. Off. . |
| 8282090 | 10/1996 | Japan . |
| 1230542 | 5/1971 | United Kingdom . |

OTHER PUBLICATIONS

Lewis Sr., R.L.; Hawley's Condensed Chemical Dictionary, Van Nostrand Reinhold Co., New York (p. 1141), 1993.

*Primary Examiner*—Vasu Jagannathan
*Assistant Examiner*—Callie E. Shosho
*Attorney, Agent, or Firm*—Harold E. Cole

[57] ABSTRACT

An ink jet ink/receiver combination comprising: a) an ink receiving layer on a support, the ink receiving layer containing polymeric thermoplastic particles, the polymeric particles having an average particle diameter ranging from 0.5 to 20 $\mu$m. and a glass transition temperature between 40° and 120° C.; and imagewise deposited thereon b) an ink jet ink containing a carrier, a pigment, and thermoplastic polymeric latex particles having a glass transition temperature between 30° and 200° C., and an average diameter between 10 and 1000 nm; wherein the polymeric particles in the ink receiving layer are the same or different from the polymeric particles in the ink.

16 Claims, No Drawings

MELT-FUSIBLE INKJET RECORDING ELEMENTS AND INKS WITH IMPROVED DURABILITY

CROSS-REFERENCE TO RELATED APPLICATION

Reference is made to commonly-assigned copending U.S. patent application Ser. No. 09/144,031, filed Aug. 31, 1998, entitled INKS CONTAINING HEAT FUSIBLE PARTICLES AND METHOD FOR USE, by L. Shaw-Klein, T. Martin, D. Decker, C. Anderson and D. Bugner, the disclosure of which is incorporated herein.

FIELD OF THE INVENTION

The present invention relates to ink jet ink/ink receiver combination with improved gloss and abrasion resistance. Both the ink and the receiver contain matched polymeric particles.

BACKGROUND OF THE INVENTION

Inkjet printing is a non-impact method for producing images by the deposition of liquid ink drops in response to digital signals. In a typical application, the viewable image is obtained by applying liquid ink in a pixel-by-pixel manner to the ink-receiving layer (IRL) of a recording element. There are numerous schemes which may be utilized to control the deposition of ink droplets on the image-recording element to yield the desired image. In one process, known as continuous ink jet, a continuous stream of droplets is charged and deflected in an imagewise manner onto the surface of the image-recording element, while unimaged droplets are caught and returned to the ink sump. In another process, known as drop-on-demand (DOD) ink jet, individual ink droplets are projected as needed onto the image-recording element to form the desired image. Common methods of controlling the projection of ink droplets in drop-on-demand printing include piezoelectric transducers and thermal bubble formation.

Most inks commonly used in DOD inkjet printers are water-based. As such, for most outdoor applications and many indoor applications, images generated by inkjet printing with water-based inks must be laminated or otherwise protected from the elements. This requires the application of an additional layer over the image after it is printed.

The solution to the problem has been approached in many ways. For example, unexamined Japanese Patent Application #8 [1996]-282090 discloses a recording medium and image formation method in which the recording medium comprises a heat-fusible layer on a substrate, and which further comprises an ink-receiving layer containing both a pigment and a binder laminated on top of the heat-fusible layer. The recording medium is imaged with small droplets of ink and then heated. This application describes a multi-layer inkjet receiver, in which heat fusible particles are located in a layer below the topmost layer. With such a geometry, the particles' ability to interact with the ink colorant is severely reduced from the case where heat-fusible particles are at the free surface as described here.

U.S. Pat. No. 5,374,475 discloses a recording element useful for both xerographic and inkjet printing which comprises a "micro-porous layer consisting of a thermoplastic polymer free of filler material . . . such that the micro-porous structure can be eliminated by the application of heat and pressure." In one embodiment the micro-porous layer is prepared by coating a dispersion or suspension of thermoplastic particles without added binder. One problem with this approach is that the thermoplastic particle is prone to dusting and/or abrasion. Also, the disclosure teaches receivers through which colorants penetrate and are therefore best suited for dyes and not for pigments, especially where it is undesirable for the pigment particles to penetrate the pores in the receiver surface.

In U.S. Pat. No. 5,764,262 (E.I. Du Pont de Nemours and Co.) a method for forming a durable image is disclosed in which a pigmented ink is printed on a receiver comprised of a hydrophilic cross-linkable thermoplastic polymer. The image is heated to encapsulate the pigment and crosslink the polymer. It would be preferred to provide a receiver without the processing disadvantages of cross-linking chemistries and without the need to encapsulate the pigment.

There is therefore a need in the art for further improvement to produce high gloss and abrasion resistance in ink jet printing systems.

SUMMARY OF THE INVENTION

The need to apply an additional layer after printing has been eliminated by the present invention which employs a melt-fusible particle in the ink-receiving layer and also in the ink. Inkjet recording elements which comprise such particles and are printed on with the described inks are treated with heat and pressure. This causes the particles to melt and flow, thereby forming a smooth, clear surface layer of high gloss which is resistant to wet abrasion.

Herein is disclosed a recording element suitable for inkjet printing comprising a layer of particles in a film-forming binder. The particles are colorless and impervious to water, and have a glass transition temperature between 40° C. and 120° C. and an average particle diameter ranging from 0.5–20 μm. When such an ink receptive layer is used in combination with an ink comprising particulate colorants and thermoplastic latex particles superior resistance to mechanical abrasion under damp conditions may be obtained. Suitable inks are described in U.S. patent application Ser. No. 09/144,031, filed Aug. 31, 1998, entitled INKS CONTAINING HEAT FUSIBLE PARTICLES AND METHOD FOR USE, by L. Shaw-Klein, T. Martin, D. Decker, C. Anderson and D. Bugner.

Hence, there is disclosed an ink jet ink/receiver combination comprising:

a) an ink receiving layer on a support, the ink receiving layer containing polymeric thermoplastic particles, the polymeric particles having an average particle diameter ranging from 0.5 to 20 μm. and a glass transition temperature between 40° and 120° C.; and imagewise deposited thereon b) an ink jet ink containing a carrier, a pigment, and thermoplastic polymeric latex particles having a glass transition temperature between 30° and 200° C., and an average diameter between 10 and 1000 nm; wherein the polymeric particles in the ink receiving layer are the same or different from the polymeric particles in the ink.

In another aspect of the invention there is described a method of preparing ink jet ink images comprising the steps of:

a) providing an ink jet ink containing a carrier, a pigment, and thermoplastic polymeric particles having a glass transition temperature between 30° and 200° C. and an average diameter between 10 and 1000 nm;

b) providing an ink receiving layer containing polymeric thermoplastic particles, the polymeric particles having an average particle diameter ranging from 0.51 to 20 μm. and a glass transition temperature between 40° and 120° C.;

c) image-wise depositing the ink on the ink receiving layer; wherein the polymeric particles in the ink receiving layer are the same or different from the polymeric particles in the ink; and d) fusing the image to the receiving layer.

The ink jet ink/receiver combination and process of the present invention yield high quality images which are impervious to water and resistant to abrasion. The present invention also provides fast drying recording elements and a method for controlling the final gloss level on the image recording element.

DETAILED DESCRIPTION OF THE INVENTION

The image-recording elements of the present invention comprise a support, an optional backside coating (BC), an ink-receiving layer (IRL), and an optional subbing or priming layer to improve the adhesion of the IRL to the support.

With respect to the support, the ink jet recording elements of the present invention comprise either film-based or paper-based supports. Preferred film-based supports are polyesters such as poly(ethylene terephthalate) (PET) and poly (ethylene naphthalate) (PEN), vinyl polymers such as poly (vinyl chloride) or poly(styrene), polyolefins such as poly (ethylene) or poly(propylene), and the like. Other polymeric film-based supports include polycarbonates, polyurethanes, and polyimides. When the support is film, the thickness of the support may range from 25–300 mm, preferably 50–125 mm when it is transparent or translucent, and 75–200 mm when it is opaque.

The preferred embodiment with respect to a paper-based support is a resin-coated paper of the type commonly employed in the photographic industry. Such resin-coated papers useful ink recording elements have been previously described in detail in U.S. Ser. No. 08/144,177, filed Oct. 27, 1993 hereby incorporated by reference. The resin coating prevents the solvent for the IRL from penetrating the pores and fiber of the paper support and allows for a more uniform and predictable coating of the IRL, especially when widely different types of paper supports are desired. The resin coating may be applied by any of the known methods, such as solvent coating, melt-extrusion coating, or by lamination. The resin coating may also contain the usual addenda for enhancing its physical and optical properties, such as surfactants, optical brighteners, tinting dyes, plasticizers, light stabilizers, and the like. Poly(ethylene) (PE) is commonly employed as a resin coating on photographic papers. For applications in which the receivers are sometimes subjected to relatively high temperatures, poly(propylene) (PP) has been used as a resin coating on paper. Isotactic PP is an especially preferred resin for use on resin-coated paper-based ink jet receivers in applications in which heat is applied to the back side of the support to speed up the drying of the ink. The resin coating is normally employed at a thickness ranging from 6 to 65 mm, preferably 10 to 40 mm. As for the paper support itself, the thickness may range from 10–500 mm, preferably 75–225 mm.

The backside (side opposite the imageable side) of the support may be optionally coated with one or more layers for the purpose of controlling friction, curl, resistivity, and the like.

The IRL is coated at a thickness ranging from 1–30 microns, preferably 4–20 microns. Optionally the IRL may be split into two or more layers. In either case, at least the top-most layer needs to contain melt-fusible particles. The layer containing the melt-fusible particles may include a film-forming material which under typical coating and drying conditions dries to form a continuous film binder which provides both cohesion of the particles within the layer and adhesion of the particles to the underlying layer. The preferred ratio of binder to particles ranges from 1:1 to 1:100, most preferably between 1:5 to 1:20. In certain cases, the particles may comprise 100% of the topmost ink receiving layer. The binder may be any hydrophilic film forming binder. Preferred binders are gelatin, poly(vinyl pyrrolidone), poly(vinyl alcohol), poly(ethylene oxide), poly(ester ionomers), and the like. Mixtures of these polymers may also be used. The layer can be coated without the use of a binder if the particulates comprising the coating have sufficient attraction for each other to provide a reasonable cohesive strength to the coating such that it can be safely handled without dusting.

The preferred particles are colorless and impervious to water, have particle sizes ranging from 0.5–20 μm, and have glass transition temperatures ranging from 40 degrees C. to 120 degrees C. As such, many known thermoplastic polymers can be used to prepare these particles. Most preferred are the so-called styrene-acrylic copolymers and the polyesters which are currently employed as thermoplastic binders for electroscopic toner particles. For a listing of useful thermoplastic polymers and particle forming methods, as well as preferred methods of fusing the imaged recording element of the present invention, please see U.S. Pat. No. 5,804,341, entitled PROTECTIVE OVERCOATS FOR SILVER HALIDE PHOTOGRAPHIC ELEMENTS, page 11, line 16 through page 13, line 18, which is incorporated herein by reference.

Surfactants may also be added to the coating solution to enhance surface uniformity and to adjust the surface tension of the dried coating. Antioxidants and UV-absorbers may also be present in either the IRL, the melt-fusible particle, or both to further enhance image durability.

The recording elements of the present invention can be imaged by any known inkjet recording process, including those which employ either dye-based or pigment-based inks. The most preferred inkjet recording processes are thermal and/or piezo drop-on-demand inkjet printing.

The following examples further serve to illustrate the elements and process of the present invention.

Preferred inks to be used in combination with the above mentioned receiver are described in the co-pending application U.S. patent application Ser. No. 09/144,031, filed Aug. 31, 1998, entitled INKS CONTAINING HEAT FUSIBLE PARTICLES AND METHOD FOR USE, filed on even date herewith. In general, such inks comprise water, humectants, a colorant, surfactants and dispersants, and small thermoplastic polymeric latexes. Common methods for producing such materials are also described in the copending application, as are preferred ranges for latex particle sizes and glass transition temperatures.

EXAMPLES

Experimental pigmented inks were all prepared identically, with the exception that the inks of the invention each contained a latex polymer. Two different latex polymers in particular were identified as providing small particles which do not interfere with reliability during firing of the inks from a thermal inkjet printhead (Hewlett Packard design HP 51626A). The preparation of the latexes is described below:

Poly(methyl methacrylate-co-methacrylic acid), "PMmMa":

To a two-liter reactor, 918 ml of demineralized water and 6.08 grams of Strodex PK90™ surfactant (Dexter Chemicals Corporation) were added. The reactor was heated to 80 degrees C. in a nitrogen atmosphere with constant stirring at 100 revolutions per minute.

The following were added to a two-liter, round-bottomed flask: 518 ml demineralized water; 7.30 g Strodex PK90™; 16.2 g methacrylic acid; and 523.8 g methyl methacrylate. The flask was stirred to emulsify this monomer mixture.

With the reactor at 80 degrees C., 3.96 g of sodium persulfate were added to the reactor and 904.5 g of the monomer emulsion were added at a constant rate over a 60 minute period. The resulting latex was then stirred at 80 degrees C. for 2–3 hours, and then cooled to 20 degrees C. and filtered through cheesecloth. The solids were 25.8% by weight and the mean latex particle size was 115.8 nm.

Poly(styrene-co-2-acrylamido-2-methylpropane sulfonic acid); "PSAampsa":

This polymer was prepared identically to that described above, except that 523.8 g styrene monomer replaced the methyl methacrylate monomer, and 32.4 g of a 50 weight % solution of 2-acrylamido-2-methylpropane sulfonic acid replaced the methacrylic acid. The final solids of the latex dispersion was 25.9 weight % and the particle size was 72.8 nm.

The preparation of the pigment millgrind proceeded as follows:

| | |
|---|---|
| Polymeric beads, mean diameter of 50 μm (milling media) | 325.0 g |
| Quinacridone (Sun Chemicals 228-0013) | 30.0 g |
| Oleoyl methyl taurine, (OMT) sodium salt | 9.0 g |
| Deionized water | 208.0 g |
| Proxel GLX ™ (Zeneca) | 0.2 g |

The above components were milled using a high energy media mill manufactured by Morehouse-Cowles Hochmeyer. The mill was run for 10 hours at room temperature. The particle size distribution was determined using a Leeds and Northrup Ultra Particle Size Analyzer (UPA). The D50 (50% of the particles were smaller than this value) of the pigment red 122 millgrind was about 0.010 μm.

Inks were formulated as follows:

| Ink | Deionized water | PMmMa latex dispersion | PSAampsa latex dispersion | Diethylene Glycol | Magenta Millgrind |
|---|---|---|---|---|---|
| A | 24.5 g | — | 3.0 g | 6.0 g | 16.5 g |
| B | 24.5 g | 3.0 g | — | 6.0 g | 16.5 g |

Each ink formulation was loaded into a Hewlett-Packard inkjet cartridge, model number 51626A. The cartridge was then placed in a Hewlett Packard printer, model number 520. Using a Corel Draw image target, 100% ink coverage was specified and printed in a large patch on each receiver of interest.

RECEIVERS

Fusible particles for receiver:

Polymeric beads were formed by a conventional limited coalescence procedure which is disclosed in U.S. Pat. No. 5,288,598 (Eastman Kodak). Ludox CL™ (DuPont), a 22 nm diameter colloidal silica dispersion in which each particle is coated with a layer of alumina, was used as the colloidal inorganic particulate shell. The composition of the polymeric beads used in the following examples is poly (styrene-co-butyl acrylate-co-divinylbenzene), ("SBaDvb"), in a molar ratio 70 styrene/30 butyl acrylate and 0.5 divinylbenzene added as a crosslinker. The glass transition temperature is 103.2 degrees centigrade, and the median particle size (by Coulter multisizer) was 1.0 micrometers (number average) or 1.4 micrometers (volume average). The beads were dispersed in water at 21% solids.

Example 1

Photographic grade polyethylene-resin coated paper was treated with a corona discharge in order to enhance adhesion. A single layer of the SBaDvb dispersion described above was coated directly on the resin coated paper and dried thoroughly to yield a dry coating weight of 10.8 grams/square meter.

Example 2

On the same support, a two-layer pack was coated simultaneously by bead coating. The bottom layer, in contact with the paper resin surface, was coated from a 10 weight per cent solids solution comprising non deionized, lime processed, photographic quality ossein gelatin (Eastman Gelatine) in order to yield a dry coverage of 5.4 grams/square meter. A simultaneous overcoat was provided identical in composition and dry thickness to the single layer described in example 1. The entire coated wet pack was chill set at 40 degrees Centigrade, then dried thoroughly by forced air heating at 120 degrees Centigrade.

Example 3

This sample was prepared identically to example 2, except that the simultaneous overcoat comprising the SBaDvb polymeric beads was designed to yield a dry coating weight of 16.2 grams/square meter.

Comparative Example 4

On corona discharge treated resin coated paper, a single layer comprising non-deionized, lime processed, photographic quality ossein gelatin (Eastman Gelatine) was produced by bead coating from a solution of gelatin in water at 10% solids. The wet film was chill set at 40 degrees C. and dried thoroughly at 120 degrees C. The final dry weight of the film was 7.6 grams/square meter.

Comparative Example 5

On corona discharge treated resin coated paper, a single layer comprising polyvinyl alcohol (Elvanol 71-30) was formed. The coating solution comprised 10 weight % polyvinyl alcohol, to which hydrochloric acid was added dropwise to reduce the pH to 4.0. The solution was bead coated with a small amount of added surfactant (Dixie 10G) and dried by forced air heating to yield a film with a dry coverage of 7.7 grams/square meter.

Comparative Example 6

A coating identical to that described in Comparative example 5 was produced, except that a crosslinker (Glutaraldehyde, 50% in water, Acros/Fisher Scientific) was added to the coating melt such that its weight comprised 5% of the polyvinyl alcohol weight.

On each of the examples and comparative examples, solid blocks of color were produced using each of the thermoplastic-latex-containing inks A and B described above. After printing, the image was passed through rollers heated to 120° C. at a rate of 8 inches/minute. A sheet of silicone-treated polyethylene terephthalate was placed over the image in order to ensure that there was no adhesion to the heated rollers. Once the image was fused, the silicone-treated film was removed. For purposes of the present invention, any standard lamination technique can be used.

Durability was evaluated by rubbing the image with a wet cotton swab and recording how much colorant was removed for a given number of rubs. Results are recorded below for each ink/receiver combination; before and after heat fusing.

| Example | Ink A: After Fusing | Ink B: After Fusing |
|---|---|---|
| 1 | 20 rubs/slight removal | 20 rubs/slight removal |
| 2 | 20 rubs/slight removal | 20 rubs/slight removal |
| 3 | 20 rubs/no removal | 20 rubs/no removal |
| 4 (comparative) | 2 rubs/all removed | 2 rubs/all removed |
| 5 (comparative) | 2 rubs/partial removal | 2 rubs/partial removal |
| 6 (comparative) | 2 rubs/all removed | 2 rubs/all removed |

The superiority of fusible particulate receivers for wet rub resistance when used in combination with inks containing fusible particles as described in U.S. patent application Ser. No. 09/144,031, filed Aug. 31, 1998, entitled INKS CONTAINING HEAT FUSIBLE PARTICLES AND METHOD FOR USE filed on even date herewith, is clearly evident.

Example 7

An ink was made identically to inks A and B above, except that no polymeric latex particles were added. When printed on the receiver described in Example 2, then fused as described above, there was slight colorant removal when rubbed 20 times with a dry cotton swab. When Ink A was used instead, no colorant removal was observed when the fused system was rubbed 20 times with a dry cotton swab. This observation confirms the conclusions of U.S. patent application Ser. No. 09/144,031, filed Aug. 31, 1998, entitled INKS CONTAINING HEAT FUSIBLE PARTICLES AND METHOD FOR USE, indicating the superiority of latex containing inks when evaluated for dry abrasion resistance.

The invention has been described in detail with particular reference to certain preferred embodiments thereof, but it will be understood that variations and modifications can be effected within the spirit and scope of the invention.

What is claimed is:

1. An ink jet ink/receiver combination comprising:

a) an ink receiving layer on a support, the ink receiving layer containing polymeric thermoplastic particles, the polymeric particles having an average particle diameter ranging from 0.5 to 20 μm, and a glass transition temperature between 40° and 120° C.; and imagewise deposited thereon b) an ink jet ink containing a carrier, a pigment, and thermoplastic polymeric latex particles having a glass transition temperature between 30° and 200° C., and an average diameter between 10 and 1000 nm; wherein the polymeric particles in the ink receiving layer are the same or different from the polymeric particles in the ink.

2. The ink jet ink/receiver combination of claim 1 wherein the weight ratio of thermoplastic latex particles: pigmented colorant particles ranges from 1:20 to 9:1.

3. The ink jet ink/receiver combination of claim 1 wherein the weight ratio of thermoplastic latex particles: pigmented colorant particles ranges from 1:5 to 1:1.

4. The ink jet ink/receiver combination of claim 1 wherein the average diameter of the polymeric particles in the ink is between 10 and 100 nm.

5. The ink jet ink/receiver combination of claim 1 wherein the glass transition temperature of the polymeric particles in the ink is between 100° C. and 200° C.

6. The ink jet ink/receiver combination of claim 1 wherein the concentration of polymeric particles in the receiver is between 30 and 100 weight percent of the total composition in the receiver.

7. The ink jet ink/receiver combination of claim 6 wherein the concentration of polymeric particles in the receiver is between 80 and 100 weight percent of the total composition in the receiver.

8. The ink jet ink/receiver combination of claim 1 wherein the average diameter of the polymeric particles in the receiver is between 50 and 20,000 nm.

9. The ink jet ink/receiver combination of claim 8 wherein the average diameter of the polymeric particles in the receiver is between 800 and 5000 nm.

10. The ink jet ink/receiver combination of claim 1 wherein the glass transition temperature of the polymeric particles in the receiver is between 100° C. and 200° C.

11. The ink jet ink/receiver combination of claim 1 wherein the polymeric particles in the ink and in the receiver are selected from interpolymers of ethylenically unsaturated monomers.

12. The ink jet ink/receiver combination of claim 11 wherein the polymeric particles in the ink and in the receiver are selected from the group consisting of homopolymers or copolymers of acrylic or methacrylic acid, alkyl esters or hydroxyalkyl esters of acrylic or methacrylic acid, styrene and its derivatives, itaconic acid or its mono- or di-alkyl esters, butadiene, vinyl chloride, and vinylidene chloride.

13. An ink jet ink/receiver combination comprising:

a support;

on the support, an ink jet ink receiving layer containing polymeric thermoplastic particles, the polymeric particles having an average particle diameter ranging from 0.5 to 20 μm, and a glass transition temperature between 40° and 120° C.; and imagewise deposited thereon ink jet ink containing a carrier, a pigment, and thermoplastic polymeric particles having a glass transition temperature between 30° and 200° C., and an average diameter between 10 and 1000 nm; wherein the polymeric particles in the ink receiving layer are the same or different from the polymeric particles in the ink.

14. A method of preparing ink jet ink images comprising the steps of:

a) providing an ink jet ink containing a carrier a pigment, and thermoplastic polymeric particles having a glass transition temperature between 30° and 200° C. and an average diameter between 10 and 1000 nm;

b) providing an ink receiving layer containing polymeric thermoplastic particles, the polymeric particles having an average particle diameter ranging from 0.51 to 20 μm, and a glass transition temperature between 40° and 120° C.;

c) image-wise depositing the ink on the ink receiving layer; wherein the polymeric particles in the ink receiving layer are the same or different from the polymeric particles in the ink; and d) fusing the image to the receiving layer.

15. An ink jet printing method, comprising the steps of:

providing an ink jet printer that is responsive to digital data signals;

loading the printer with an ink receiving layer containing polymeric thermoplastic particles, the polymeric particles having an average particle diameter ranging from 0.51 to 20 μm, and a glass transition temperature between 40° and 120° C.;

loading the printer with an ink jet ink, said ink jet ink comprising polymeric particles having a glass transition temperature between 30° and 200° C., and an average diameter between 10 and 1000 nm;

printing on the ink receiving layer with the ink jet ink in response to the digital data signals; and fusing the ink to the ink receiving layer.

16. An ink jet ink receiver comprising an ink receiving layer on a support, the ink receiving layer containing polymeric thermoplastic particles, the polymeric particles having an average particle diameter ranging from 1 to 20 μm, and a glass transition temperature between 40° and 120° C.

* * * * *